United States Patent [19]
Dent

[11] Patent Number: 5,584,057
[45] Date of Patent: Dec. 10, 1996

[54] USE OF DIVERSITY TRANSMISSION TO RELAX ADJACENT CHANNEL REQUIREMENTS IN MOBILE TELEPHONE SYSTEMS

[75] Inventor: Paul W. Dent, Stehag, Sweden

[73] Assignee: Ericsson Inc., Research Triangle Park, N.C.

[21] Appl. No.: 497,022

[22] Filed: Jun. 30, 1995

Related U.S. Application Data

[63] Continuation of Ser. No. 53,871, Apr. 29, 1993, abandoned.

[51] Int. Cl.$^6$ ....................................... H04B 7/06
[52] U.S. Cl. ................. 455/101; 455/105; 455/54.1; 379/58; 375/347
[58] Field of Search ........................ 455/103, 101, 455/102, 105, 56.1, 54.1, 127.63, 119; 375/347; 379/58; 333/10, 111

[56] References Cited

U.S. PATENT DOCUMENTS

| | | | |
|---|---|---|---|
| 3,662,268 | 5/1972 | Gans et al. | 325/56 |
| 3,693,088 | 9/1972 | Rustako, Jr. et al. | 325/56 |
| 3,748,600 | 7/1973 | Fisher et al. | 333/10 |
| 4,081,748 | 3/1978 | Batz | 325/56 |
| 4,298,984 | 11/1981 | Baker | 375/40 |
| 4,383,332 | 5/1983 | Glance et al. | 455/33 |
| 4,513,412 | 4/1985 | Cox | 455/101 X |
| 4,635,006 | 1/1987 | Praba | 333/111 |
| 4,841,527 | 6/1989 | Raychaudhuri et al. | 371/32 |
| 4,912,722 | 3/1990 | Carlin | 375/1 |
| 5,163,181 | 11/1992 | Koontz | 455/103 |
| 5,228,055 | 7/1993 | Uchida et al. | 375/1 |
| 5,274,836 | 12/1993 | Lux | 455/103 X |
| 5,280,472 | 1/1994 | Gilhouser et al. | 375/1 X |
| 5,289,499 | 2/1994 | Weerackody | 375/1 |
| 5,305,353 | 4/1994 | Weerackody | 375/347 |
| 5,369,800 | 11/1994 | Takagi et al. | 455/101 X |

*Primary Examiner*—Reinhard J. Eisenzopf
*Assistant Examiner*—Philip J. Sobutka
*Attorney, Agent, or Firm*—Burns, Doane, Swecker & Mathis, L.L.P.

[57] ABSTRACT

The present invention includes a system and method for reducing adjacent channel interference, particularly in CDMA radiotelephone systems. Diversity transmissions are provided for weaker signals to be transmitted by coupling delayed or advanced versions of these weaker signals to an antenna which is also transmitting signals on an adjacent frequency.

45 Claims, 2 Drawing Sheets

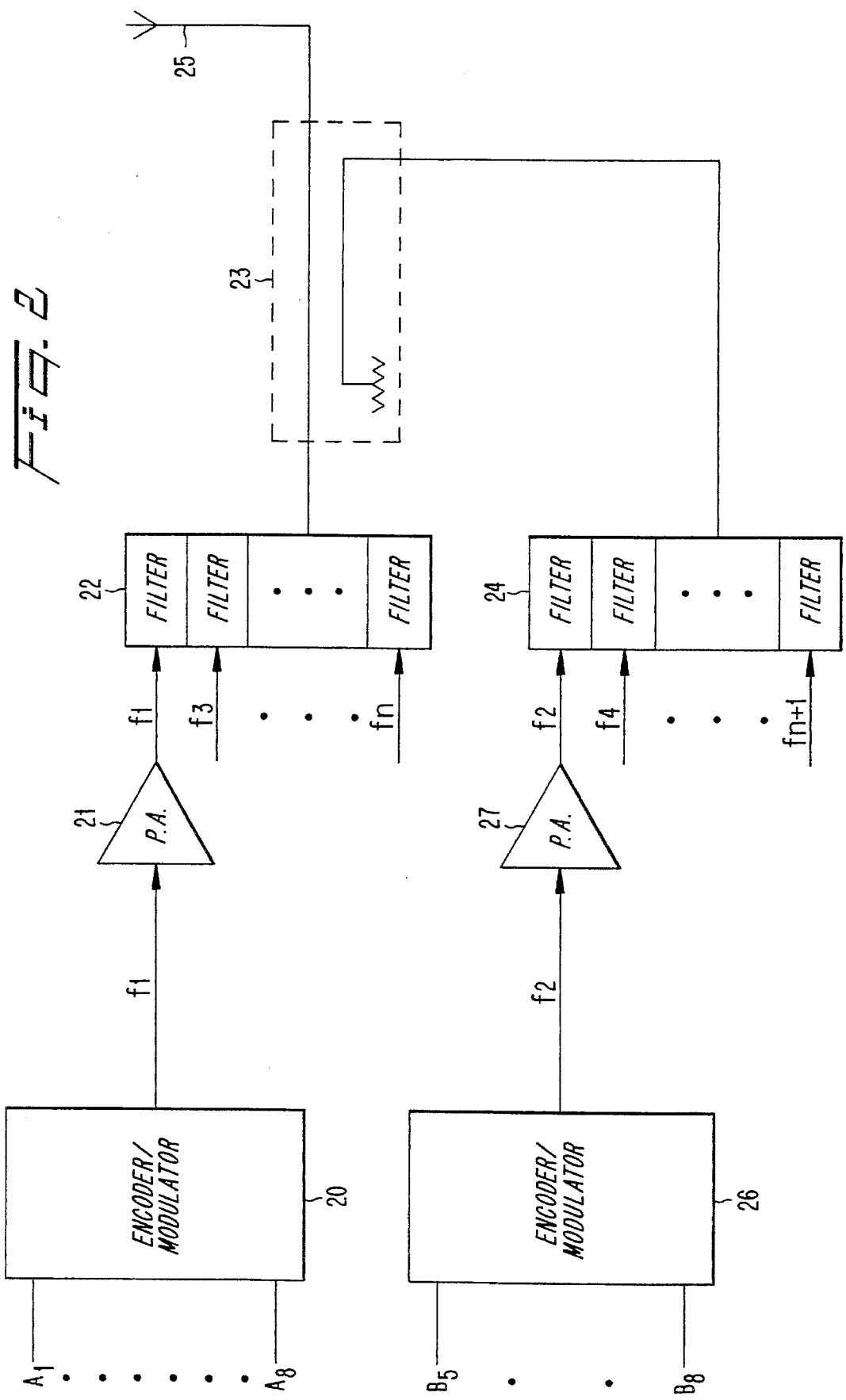

USE OF DIVERSITY TRANSMISSION TO RELAX ADJACENT CHANNEL REQUIREMENTS IN MOBILE TELEPHONE SYSTEMS

This application is a continuation of application Ser. No. 08/053,871, filed Apr. 29, 1993 now abandoned.

BACKGROUND

The present invention generally relates to cellular, mobile, radiotelephone systems using a type of coded transmission known as CDMA. More particularly, the present invention relates to methods and systems for reducing adjacent channel interference in CDMA radiotelephone systems.

Cellular mobile phone systems comprise a number of fixed or base stations that are in communication with a number of portable or mobile stations. The information flow from the base-to-mobile is termed the downlink, while the information flow from the mobile-to-base is termed the uplink.

Current cellular mobile telephone systems primarily employ Frequency Division Multiple Access (FDMA) and analog frequency modulation for speech transmission. Systems will soon be installed worldwide using Time Division Multiple Access (TDMA) and digital transmission of speech to provide higher capacity. Code Division Multiple Access (CDMA) is a well-known technique that has principally been used for military satellite communications because of its jamming resistance. CDMA permits several signals to simultaneously use the same frequency even in the same cell, in contrast to FDMA systems that require different signals in the same cell to use different frequencies, and TDMA systems that permit use of the same frequency but not at the same time.

CDMA systems have not previously been favored for landmobile communications because of the so-called near/far ratio problem. In landmobile communications, the ratio of the distance of one mobile station to a base station to the distance of another mobile station to the base station can be relatively high. This can lead to a large difference in the signal strength that the base station receives from both mobile stations because signal propagation loss varies roughly as a function of the fourth power of the distance between a mobile station and a base station. Since mobile stations in CDMA systems can transmit on the same frequency at the same time, signals received at the base station having relatively high signal strengths tend to interfere with those having lower signal strengths. This is not a problem in satellite communications since a geostationary satellite is equidistant from all points on the earth.

Recent advances in CDMA techniques, such as subtractive demodulation, have resulted in more attention now being given to CDMA techniques for landmobile radio applications. In subtractive CDMA demodulation, signals received at the base station are demodulated in signal-strength order from highest to lowest, and decoded signals are subtracted out of the composite signal before attempting to decode the next weakest signal. Subtractive demodulation combined with power tapering, which is described below, on the downlink and appropriate selection of mobile power on the uplink, controls the near/far ratio problem with respect to signals on the same frequency. These techniques, however, do not compensate for potential interference from signals on other frequencies which would be too complicated to decode and subtract out. Therefore conventional CDMA systems, as well as subtractive demodulation systems, do not provide any particular benefits in terms of adjacent channel interference tolerance.

Greatest capacity in CDMA systems can be obtained when the power used to transmit to a mobile station on the downlink is tailored according to the distance from the mobile station to the center of the cell since this will reduce interference. Higher power is transmitted to mobile stations further away while lower power is transmitted to those mobile stations near the cell center. The consequence of this technique, called power tapering, is that the weaker signals will be more sensitive to interference from energy in the adjacent channels than will be the stronger signals. It is unfortunately the weaker signals' greater sensitivity that determines the quality of channel filters used in receivers to suppress adjacent channel energy and, therefore, the benefits of power tapering can be offset by the expense of the channel filters.

Another factor in determining the required adjacent channel suppression is the fading margin that must be allowed. Even if adjacent channel signals are transmitted from the same base station antenna as the desired signal, these adjacent channel signals will fade in a manner uncorrelated to the fading of the desired signal, so that the adjacent channel signal can at times become stronger while the desired signal fades weaker. If 0.1 percent fading tolerance must be allowed for, a fading margin of over 30 dB must be added to the required adjacent channel suppression requirements.

SUMMARY

The present invention overcomes these and other problems by providing methods and systems for improving the tolerance of CDMA systems to non-subtractable interference sources, to match the benefits conferred by subtractive demodulation as regards subtractable co-channel interference. According to a preferred embodiment of the invention this object is achieved by providing a diversity path on the downlink by means of a second, delayed transmission from a different antenna. The diversity transmissions are, for example, used for those signals at the low end of the power taper, and can be multiplexed into an antenna used for transmitting the adjacent channel signals, and vice versa, i.e., the diversity transmissions on the adjacent frequency take place via the antenna used for transmissions on the first frequency.

By providing within-cell diversity for weaker signals according to exemplary embodiments of the present invention, the probability of fading occurring for those signals is greatly reduced. Thus, much less than a 30 dB fading margin is needed to provide 0.1 percent fading tolerance and adjacent channel protection requirements are commensurately reduced.

One advantage which arises from using CDMA in cellular communications is the ability to use the same radio frequencies concurrently in adjacent cells. Of course, capacity will be reduced due to the contribution to the interference in a cell from neighboring cells using the same radio frequency. It has been determined, however, that maximimum capacity in CDMA systems can be achieved by tolerating a certain amount of additional interference that results from using the same frequencies in adjacent cells. This, however, leads to another difficulty, specifically that of coupling transmitters to a common antenna which are employing immediately adjacent frequencies with no guard band between each signal. Exemplary embodiments of the present invention overcome this problem by providing two or more separated transmit antennnas at base stations. These transmit antennas serve the dual purpose of handling alternate transmitter channel frequencies so as to overcome the lack of guard band problem while providing transmit diversity for vulnerable (i.e., weaker) signals.

Thus according to one exemplary embodiment a diversity transmission system comprises: a first modulator for modulating a first set of information signals on to a first radio carrier frequency, a second modulator for modulating at least one of a second set of information signals on to a second radio carrier frequency, a first transmit power amplifier for the modulated signal at the first carrier frequency, a second transmit power amplifier for the modulated signal at the second carrier frequency, and a radio frequency combining network for combining the outputs of the first and second transmit power amplifiers and coupling the combined signal to a first antenna for transmission.

BRIEF DESCRIPTION OF THE DRAWINGS

These and other objects and features of the present invention will become more apparent from reading the following detailed description in conjunction with the drawings, in which:

FIG. 2 illustrates a block diagram of another diversity transmission system according to a second embodiment of the present invention.

DETAILED DESCRIPTION

Figure 1:
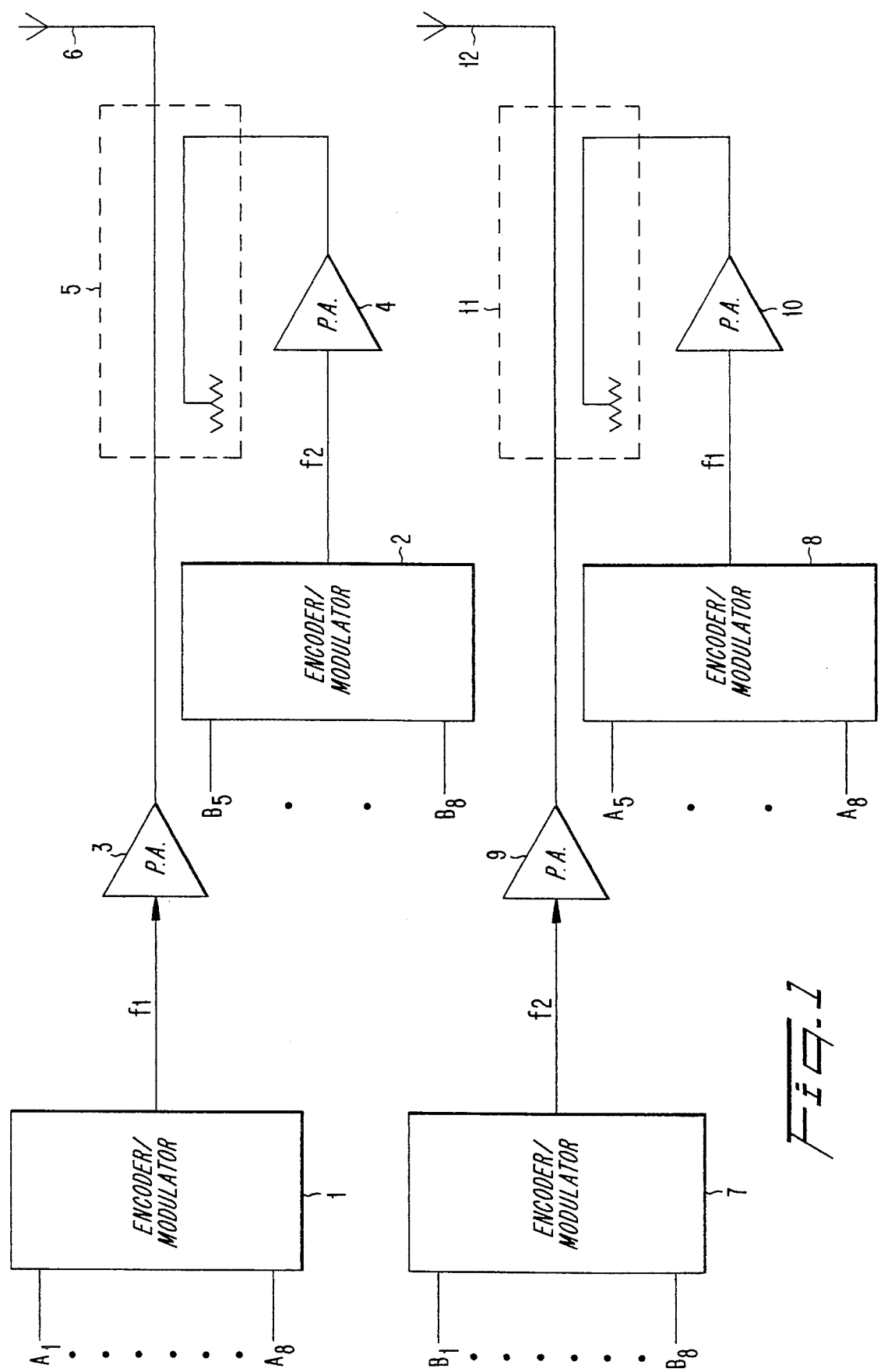
FIG. 1 illustrates a block diagram of a diversity transmission system according to a first embodiment of the present invention.

Referring to FIG. 1, a number of signals denoted $A_1$–$A_8$ to be transmitted with respectively descending signal strengths are applied to a signal encoder and modulator 1 where they are coded and modulated upon a carrier frequency f1. The composite output signal containing the sum of said modulated signals having desired descending signal strength levels is fed to a transmit power amplifier 3. The power output of this amplifier is sufficient to cope with the strongest signal $A_1$ as well as the other signals $A_2$–$A_8$, and can be, for example, a linear power amplifier to minimize intermodulation.

A similar arrangement including modulator 7 and power amplifier 9 is provided to transmit a second set of signals $B_1$–$B_8$ using an adjacent carrier frequency f2. The output signals from the power amplifiers 3 and 9 pass through directional couplers or other suitable RF summing networks 5 and 11, respectively, to the respective antennas 6 and 12.

A third encoder and modulator 2 is provided for a number of the weaker B group signals $B_5$–$B_8$ which are impressed on carrier frequency f2 and amplified in a power amplifier 4. This power amplifier 4 has a reduced power output compared to the power amplifier 3 since it processes the relatively weaker signals $B_5$–$B_8$. The output of the power amplifier 4 at carrier frequency f2 is added to the output of the power amplifiers at carrier frequency f1 in the directional coupler 5.

Similarly, a modulator 8 for the weaker group of A signals $A_5$–$A_8$ and the corresponding reduced power amplifier 10 are provided, the output at carrier frequency f1 of which is added in a directional coupler 11 to the output at carrier frequency f2 of the power amplifier 9. Antenna 6 thus provides transmit diversity for the weaker group of B signals while antenna 12 provides the same for the weaker group of A signals.

The modulator 8 encodes the weaker A signals with at least one chip period delay or advance compared to the first modulator 1. Similarly, the modulators 7 and 2 have the same chip timing relationship for the B signals, so that a mobile station receiver perceives the diversity signal as an echo or pre-echo of the main signal depending on whether the B signals have been delayed or advanced, respectively. The term "chip" as used herein denotes a bit in a codeword transmitted in a CDMA system and a chip period is the amount of time needed to transmit one bit of a codeword. The mobile station can then use an echo-equalizing receiver, such as a RAKE receiver, to combine energy from different echoes to add the diversity signals. An example of such a RAKE receiver can be found in commonly-assigned, copending U.S. patent application Ser. No. 08/054,028, now U.S. Pat. No. 5,305,349, entitled "Quantized Coherent Rake Receiver" and filed on Apr. 29, 1993.

For the purposes of illustrating this exemplary embodiment, a power tapering has been computed for one particular set of system parameters and is set forth below as Table 1. It is beyond the scope of the present invention to discuss how such power tapering computations are performed, however an exemplary method and system can be found in copending U.S. patent application Ser. No. 07/866,554 entitled "Duplex Power Control" which was filed on Apr. 10, 1992 and which is incorporated here by reference.

TABLE 1

| Level number or position | Signal level wrt total power | Corresponds to signal |
| --- | --- | --- |
| 1 | −8 dB | $A_1$ |
| 2 | −8.5 dB | |
| 3 | −9.1 dB | $A_2$ |
| 4 | −9.8 dB | |
| 5 | −10.6 dB | |
| 6 | −11.5 dB | |
| 7 | −12.4 dB | $A_3$ |
| 8 | −13.3 dB | |
| 9 | −14.2 dB | |
| 10 | −15.1 dB | |
| 11 | −16 dB | |
| 12 | −17 dB | |
| 13 | −18 dB | $A_4$ |
| 14 | −19 dB | |
| 15 | −20 dB | |
| 16 | −21.1 dB | |
| 17 | −22.3 dB | |
| 18 | −23.6 dB | $A_5$ |
| 19 | −25.5 dB | $A_6$ |
| 20 | −27.5 dB | |
| 21 | −29.5 dB | |
| 22 | −32 dB | |
| 23 | −36 dB | $A_7$ |
| 24 | −42 dB | $A_8$ |

Note that the above table illustrates a system which is not fully loaded as only eight of the available signal levels are being used. Signals $A_1$–$A_8$ are initially adjusted to different power levels according to the distance of the intended mobile recipient from the base station. Power adjustment can be achieved, for example, by providing a different modulator for each signal with the outputs thereof being scaled to the desired power level before summing all of the signals together. Alternately, the chipstreams can each be scaled to the desired power level, added together, applied to a common premodulation filter and then modulated by a single modulator.

The indexing of the signals indicates the order after sorting in descending order of signal strength. In the exemplary Table 1, above, the optimum signal strengths for a uniform area distribution of mobiles covers a 34 dB range from strongest to weakest. In such an exemplary case, those signals more than 15 dB below the strongest signal can be ascribed to a group for which diversity transmissions will be provided by means of the lower power auxiliary transmit amplifiers (e.g., signals $A_5-A_8$ in the example of Table 1).

Although a cutoff of more than 15 dB below the strongest signal is used in the aforementioned exemplary embodiment for separating signals considered to be relatively strong, for which within-cell transmission diversity is not provided, from signals considered to be relatively weak, for which within-cell transmission diversity is provided, those skilled in the art will readily appreciate that other thresholds could be used. Moreover, those signals which border the cutoff may be assigned at one time to the group which includes the stronger signals and at another time to the group that includes the weaker signals due to movement of a mobile station within the cell.

When a signal is reassigned from, for example, the stronger group to the weaker group, there arises a need to start transmitting a corresponding signal in the diversity path that had not been transmitted during the previous period. To avoid reduction in decoding performance at the receiver, such signals are smoothly ramped up to a target power level. Likewise, upon reassignment from the weaker group to the stronger group, the corresponding signal in the diversity path is gradually ramped down. Accordingly, the average level of diversity transmission changes smoothly as a signal passes from one to another of the stronger and weaker groups.

If the desired total average transmission power for the signals in the stronger group is denoted P1, for the weaker group P2, and the directional coupler has a power loss factor k from the auxiliary (lower power) power amplifier to the antenna and a power loss factor (1−k) from the main power amplifier to the antenna, then the total average power the two power amplifiers must deliver is given by:

$$Ptot = \frac{P1}{(1-k)} + \frac{P2}{k} \quad (1)$$

Total average transmission power can be minimized by choosing k/(1−k) in Equation (1) to equal $\sqrt{P2/P1}$. For maximum efficiency, the coupling ratio of the directional coupler should be half the desired number of dBs difference in power level between the main transmission and the diversity transmission, as should also the ratio of P1 to P2. Thus, for a 15 dB difference in average transmitted power between the main and diversity transmissions, the auxiliary power amplifier has a power level which is 7.5 dB (5.6 times) lower than the power level of the main power amplifier. Therefore, k=1/5.6 and 1/(1−k)=1/(1−1/5.6) multiplying top and bottom by 5.6 results in 5.6/4.6 or 1.22. Accordingly, the main power amplifier is then 5.6/4.6 or 1.22 times the desired main signal power output level (P1) to compensate for the loss of the directional coupler.

Those skilled in the art will appreciate that principles of the present invention can be extended to more than two antennas and frequencies and to the provision of more than one diversity transmission for each main transmission. Further diversity transmissions can be made with progressively delayed or advanced versions of the main signal such that each separate diversity transmission appears like an echo (or pre-echo) having a different time delay (or advance) equal to multiples of the chip period.

Another exemplary preferred embodiment will now be described with reference to FIG. 2. Separate antennas can be provided where adjacent channels are used in the same cell, due to the impracticality of building low-loss multiplexing filters that can couple adjacent frequencies to the same antenna without a guard band between them. It is generally more feasible to multiplex alternate frequency channels into one antenna and those channels in between into another antenna. While the exemplary embodiment of FIG. 2 illustrates one such transmission system, those skilled in the art will appreciate that the "in between" channels (e.g., f2, f4, f6 at modulator 22) can be multiplexed into another antenna (not shown) using a similar system.

Referring to FIG. 2, a first set of signals $A_1-A_8$ to be transmitted is modulated onto carrier frequency f1 in the multiple modulator 20. The output signal of the modulator is amplified in a high-power transmit amplifier 21, the output of which is connected to one input of multiplexing filter 22. The other inputs of the multiplexing filter 22 are available to connect to transmit amplifiers (not shown) using carrier frequencies f3, f5, f7, etc.

The output of the multiplexing filter 22 is combined in a directional coupler 23 or similar RF combining network with the lower power output of a multiplexing filter 24 adapted to carrier frequencies f2, f4, f6 . . . etc. on which diversity transmissions are to be provided. The combined output from the directional coupler 23 is connected to the antenna 25.

The signals $B_5-B_8$ for which diversity transmissions are to be provided are modulated onto carrier frequency f2 in multiple signal modulator 26, amplified in the lower power diversity transmit amplifier 27 and then fed to the f2 input of the multiplexing filter 24. As mentioned earlier, a duplicate arrangement (not shown) is provided with a separate antenna for the main transmission channel of signals $B_1-B_8$ and the diversity transmission of signals $A_5-A_8$.

Although exemplary embodiments of the present invention have been described, for example, in terms of using plural antennas for transmitting signals, those skilled in the art will recognize that the present can be implemented in other ways. For example, a single dual-polarization antenna could be substituted for the antennas 6 and 9 and the main and diversity transmissions could be coupled to separate inputs of the dual-polarization antenna. The main signal could then be transmitted at one polarity, while the diversity signal is transmitted at a polarity which is orthogonal to that of the main signal, e.g., right-hand circular and left-hand circular.

Although preferred embodiments of the present invention have been described with reference to an exemplary system having eight signals for the main transmit channel and four signals on the diversity channel, it is to be understood that this exemplary system is merely provided for illustration and that any number of signals could be supplied to either the main or diversity channels. Moreover, while particular embodiments of the present invention have been described and illustrated, it should be understood that the invention is not limited thereto since modifications can be made by persons skilled in the art. The present application contemplates any and all modifications that fall within the spirit and scope of the present invention as disclosed and claimed herein.

What is claimed is:

1. A diversity transmission system comprising:
  a first modulator for modulating a first set of information signals on to a first radio carrier frequency;

a second modulator for modulating at least one of a second set of information signals on to a second radio carrier frequency; and a radio frequency combining network for combining outputs of said first and second modulators with other signals having different carrier frequencies and coupling said combined signal to a common power amplifier and antenna for transmission, wherein said at least one of said second set of information signals serves as a diversity transmission and is transmitted at a power level lower than a same signal transmitted on said second carrier via a second antenna.

2. The diversity transmission system of claim 1, wherein said at least one of said second set of information signals serving as a diversity transmission is delayed or advanced with respect to a same signal transmitted on said second carrier frequency via a second antenna.

3. A diversity transmission system comprising:

a first modulator for modulating a first set of information signals on to a first radio carrier frequency;

a second modulator for modulating at least one of a second set of information signals on to a second radio carrier frequency; and a radio frequency combining network for combining outputs of said first and second modulators and coupling the combined signal to a common power amplifier and antenna for transmission, wherein said at least one of said second set of information signals serves as a diversity transmission and is transmitted at a power level lower than a same signal transmitted on said second carrier frequency via a second antenna.

4. The diversity transmission system of claim 3, wherein said at least one of said second set of information signals serving as a diversity transmission is delayed or advanced with respect to a same signal transmitted on said second carrier frequency via a second antenna.

5. The diversity transmission system according to claim 3 in which said common transmit power amplifier is a linear or linearized power amplifier designed to minimize intermodulation between said signals.

6. The diversity transmission system as in claim 3 further comprising:

a third modulator for modulating said second set of information signals on to said second radio carrier frequency;

a fourth modulator for modulating at least one of said first set of information signals on to said first radio carrier frequency;

a second radio frequency combining network for combining outputs of said third and fourth modulators and coupling the combined signal to a second common power amplifier and antenna for transmission.

7. The diversity transmission system as in claim 3 further comprising:

a third modulator for modulating said second set of information signals on to said second radio carrier frequency;

a third transmit power amplifier for said third modulated signal at said second carrier frequency, the output of which is fed to a second antenna for transmission.

8. The transmission system of claim 7, wherein said first and second antennas comprise orthogonal polarizations of a dual-polarization antenna.

9. A diversity transmission system comprising:

a first modulator for modulating a first set of information signals on to a first radio carrier frequency;

a second modulator for modulating at least one of a second set of information signals on to a second radio carrier frequency;

a first transmit power amplifier for said modulated signal at said first carrier frequency;

a second transmit power amplifier for said modulated signal at said second carrier frequency; and a radio frequency combining network for combining the outputs of said first and second transmit power amplifiers and coupling the combined signal to a first antenna for transmission, wherein said at least one of said second set of information signals serves as a diversity transmission and is transmitted at a power level lower than a same signal transmitted on said second carrier frequency via a second antenna.

10. The diversity transmission system of claim 9, wherein said at least one of said second set of information signals serving as a diversity transmission is delayed or advanced with respect to a same signal transmitted on said second carrier frequency via a second antenna.

11. A diversity transmission system according to claim 9, wherein said radio-frequency combining networks are multiplexing filters.

12. A diversity transmission system according to claim 9, wherein said radio-frequency combining networks are directional couplers.

13. The diversity transmission system of claim 9 further comprising:

a third modulator for modulating said second set of information signals on to said second radio carrier frequency; and a third transmit power amplifier for said third modulated signal at said second carrier frequency, the output of which is fed to a second antenna for transmission.

14. A diversity transmission system according to claim 13, wherein said second antenna is spaced many wavelengths from said first antenna so as to obtain maximum spatial diversity gain.

15. The transmission system of claim 13, wherein said first and second antennas comprise orthogonal polarizations of a dual-polarization antenna.

16. A diversity transmission system according to claim 13, wherein said at least one signal fed to said second modulator is delayed or advanced with respect to the same signal applied to said third modulator.

17. A diversity transmission system according to claim 16, wherein said at least one signal is delayed or advanced by a whole number of bit or symbol periods.

18. The diversity transmission system of claim 9 further comprising:

a third modulator for modulating said second set of information signals on to said second radio carrier frequency;

a fourth modulator for modulating at least one of said first set of information signals on to said first radio carrier frequency;

a third transmit power amplifier for amplifying a signal generated by said third modulator;

a fourth transmit power amplifying a signal generated by said fourth modulator; and a radio frequency combining network for combining outputs of said third and fourth transmit power amplifiers and coupling the combined signal to a second antenna for transmission.

19. A diversity transmission system according to claim 18, wherein said radio-frequency combining networks are multiplexing filters.

20. A diversity transmission system according to claim 18, wherein said radio-frequency combining networks are directional couplers.

21. The transmission system of claim 18, wherein said first and second antennas comprise orthogonal polarizations of a dual-polarization antenna.

22. A diversity transmission system according to claim 18, wherein said second antenna is spaced many wavelengths from said first antenna so as to obtain maximum spatial diversity gain.

23. The diversity transmission system according to claim 22 in which said at least one of said second set of signals is transmitted at a power level lower than the transmission of said first set of signals.

24. A diversity transmission system according to claim 18, wherein said at least one signal fed to said second modulator is delayed or advanced with respect to the same signal applied to said third modulator; and said at least one signal fed to said fourth modulator is delayed or advanced with respect to the same signal applied to said first modulator.

25. A diversity transmission system according to claim 24, wherein said at least one signals are delayed or advanced by a whole number of bit or symbol periods.

26. A diversity transmission system comprising:

a first modulator for modulating a first set of information signals on to a first carrier frequency;

a second modulator for modulating at least one of a second set of information signals on to a second carrier frequency;

a first transmit power amplifier for said modulated signal at said first carrier frequency;

a second transmit power amplifier for said modulated signal at said second carrier frequency;

an antenna multiplexing filter that combines an output of said first transmit power amplifier with at least one other signal having at least a third carrier frequency intended for transmission from the same antenna; and a radio frequency combining network for combining the outputs of said antenna multiplexing filter and said second transmit power amplifier and coupling the combined signal to a first antenna for transmission, wherein said at least one of said second set of information signals serves as a diversity transmission and is transmitted at a power level lower than a same signal transmitted on said second carrier frequency via a second antenna.

27. A diversity transmission system according to claim 26, wherein said at least one other signal having at least a third carrier frequency are generated by a fifth modulator and fifth transmit power amplifier.

28. The diversity transmission system of claim 26, wherein said at least one of said second set of information signals serving as a diversity transmission is delayed or advanced with respect to a same signal transmitted on said second carrier frequency via a second antenna.

29. A diversity transmission system comprising:

a first modulator for modulating a first set of information signals on to a first carrier frequency;

a second modulator for modulating at least one of a second set of information signals on to a second radio carrier frequency;

a first transmit power amplifier for said modulated signal at said first carrier frequency;

a second transmit power amplifier for said modulated signal at said second carrier frequency;

a first antenna multiplexing filter that combines an output of said first transmit power amplifier with at least one other signal having at a least a third carrier frequency intended for transmission from the first same;

a second antenna multiplexing filter that combines an output of said second transmit power amplifier with at least one other signal having at least a fourth carrier frequency intended for transmission from the same antenna; and a radio frequency combining network for combining the outputs of said first and second antenna multiplexing filters and coupling the combined signal to a first antenna for transmission, wherein said at least one of said second set of information signals serves as a diversity transmission and is transmitted at a power level lower than a same signal transmitted on said second carrier frequency via a second antenna.

30. The diversity transmission system of claim 29, wherein said at least one of said second set of information signals serving as a diversity transmission is delayed or advanced with respect to a same signal transmitted on said second carrier frequency via a second antenna.

31. A diversity transmission system according to claim 29 further comprising:

a third modulator for modulating a second set of information signals on to said second radio carrier frequency;

a fourth modulator for modulating at least one of said first set of information signals on to said first radio carrier frequency;

a third transmit power amplifier for said third modulated signal at said second carrier frequency;

a fourth transmit power amplifier for said fourth modulated signal at said first carrier frequency;

a third antenna multiplexing filter that combines an output of said third transmit power amplifier with at least one signal having at least a fourth carrier frequency intended for transmission from the same antenna;

a fourth antenna multiplexing filter that combines an output of said fourth transmit power amplifier with at least one other signal having at least a third carrier frequency intended for transmission from the same antenna; and a radio frequency combining network for combining the outputs of said third and fourth antenna multiplexing filters and coupling the combined signal to a second antenna for transmission.

32. The transmission system of claim 31, wherein said first and second antennas comprise orthogonal polarizations of a dual-polarization antenna.

33. A diversity transmission system according to claim 29, in which said at least one other signal having at least a third carrier frequency are produced by a fifth modulator and fifth transmit power amplifier.

34. A diversity transmission system according to claim 33, in which said at least one other signal having at least a fourth carrier frequency are produced by a sixth modulator and sixth transmit power amplifier.

35. A method for diversity transmission of signals in a radiotelephone system comprising the steps of:

modulating a first set of information signals onto a first set of frequency channels to produce a first set of transmit signals for transmission from a first antenna;

modulating a second set of information signals onto a second set of frequency channels to produce a second set of transmit signals;

modulating selected ones of the first set of information signals onto the first set of frequency channels to produce diversity signals;

combining the second set of transmit signals with the diversity signals for transmission from a second antenna;

wherein the first set of frequency channels comprises frequency bands which are adjacent in frequency to and alternate in frequency with frequency bands of the second set of frequency channels.

36. The method of claim 35, further comprising the step of delaying or advancing the diversity signals with respect the first set of transmit signals.

37. The method of claim 35, further comprising the step of transmitting the diversity signals at a power level lower than the power level of the first set of transmit signals.

38. A diversity transmission system comprising:

first modulating means for modulating a first set of information signals onto a first set of frequency channels to produce a first set of transmit signals for transmission from a first antenna;

second modulating means for modulating a second set of information signals onto a second set of frequency channels to produce a second set of transmit signals;

third modulating means for modulating selected ones of the first set of information signals onto the first set of frequency channels to produce diversity signals;

a combiner for combining the second set of transmit signals with the diversity signals for transmission from a second antenna;

wherein the first set of frequency channels is adjacent in frequency to and alternates in frequency with the second set of frequency channels.

39. The diversity transmission system of claim 38, wherein the diversity signals are delayed or advanced with respect the first set of transmit signals.

40. The diversity transmission system of claim 38, wherein the diversity signals are transmitted at a power level lower than the first set of transmit signals.

41. A radio transmission system for multiple signals comprising:

first transmit means for modulating a first set of information signals onto even-numbered radio channels and amplifying said first set of information signals to produce a first set of transmit signals;

second transmit means for modulating a second set of information signals onto odd-numbered radio channels and amplifying said second set of information signals to produce a second set of transmit signals;

third transmit means for modulating selected ones of said first set of information signals onto respectively assigned even-numbered radio channels and amplifying said selected signals to produce a diversity transmit signal;

first transmit multiplexer means for multiplexing said first set of transmit signals to form a first composite signal and feeding said first composite signal to a first antenna means;

second transmit multiplexer means for multiplexing said second set of transmit signals to form a second composite signal, and coupling means for coupling said second composite signal and said diversity transmit signal to a second antenna means.

42. A transmission system as in claim 41 in which said first antenna means and said second antenna means comprise orthogonal polarization inputs of a dual-polarization antenna.

43. The diversity transmission system of claim 41, wherein the selected signals are delayed or advanced with respect the first set of information signals.

44. The diversity transmission system of claim 41, wherein the selected signals are transmitted at a power level lower than the first set of information signals.

45. The diversity transmission system of claim 41, wherein the even-numbered radio channels comprise frequencies which are adjacent in frequency to and alternate in frequency with frequencies of the odd-numbered radio channels.

* * * * *